(12) United States Patent
Lin et al.

(10) Patent No.: US 11,768,112 B2
(45) Date of Patent: Sep. 26, 2023

(54) INSERT COAXIAL THERMAL RADIATION IMAGE EVALUATING SYSTEM

(71) Applicant: NATIONAL CHUNG SHAN INSTITUTE OF SCIENCE AND TECHNOLOGY, Taoyuan (TW)

(72) Inventors: Yuan-Yao Lin, Taoyuan (TW); Chao-Kuei Lee, Taoyuan (TW); Yi-Jen Chiu, Taoyuan (TW); Chung-Chun Huang, Taoyuan (TW); Qian-Mao Zhou, Taoyuan (TW); Ya-Hsuan Cheng, Taoyuan (TW); Ming-Wei Liu, Taoyuan (TW); Kuo-Kuang Jen, Taoyuan (TW); Chih-Peng Chen, Taoyuan (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 373 days.

(21) Appl. No.: 17/184,624

(22) Filed: Feb. 25, 2021

(65) Prior Publication Data

US 2021/0356326 A1 Nov. 18, 2021

(30) Foreign Application Priority Data

May 13, 2020 (TW) .................................. 109116139

(51) Int. Cl.
*G01J 5/00* (2022.01)
*G01J 5/0806* (2022.01)
*G01J 5/10* (2006.01)

(52) U.S. Cl.
CPC ............... *G01J 5/0806* (2013.01); *G01J 5/10* (2013.01); *G01J 2005/0077* (2013.01)

(58) Field of Classification Search
CPC ..... G01J 5/0806; G01J 5/10; G01J 2005/0077
See application file for complete search history.

(56) References Cited

U.S. PATENT DOCUMENTS

| 4,602,861 A * | 7/1986 | Taniguchi | ................ G02B 7/36 396/106 |
| 6,707,044 B2 * | 3/2004 | Lannestedt | .............. H04N 5/33 250/351 |

(Continued)

FOREIGN PATENT DOCUMENTS

| CN | 113053777 A * | 6/2021 | ............... B08B 3/10 |
| JP | S635678 A * | 1/1988 | |

(Continued)

*Primary Examiner* — Gail Kaplan Verbitsky

(57) ABSTRACT

An insert coaxial thermal radiation image evaluating system includes a cage support, first lens, first cage movable frame, second cage movable frame, cage holder and light detector. The first cage movable frame is movably disposed at the cage support and connected to the first lens. The second cage movable frame is movably disposed at the cage support and connected to the light detector. The cage holder is connected to the cage support to fix the cage support to an optical substrate. The first cage movable frame is movably disposed in the cage holder. The first lens and a second lens of a metal additive manufacturing system together form a structure of conjugate foci, such that a thermal radiation generated from a high-power infrared laser irradiation zone forms according to a fixed ratio an image captured by the light detector.

8 Claims, 3 Drawing Sheets

(56) References Cited

U.S. PATENT DOCUMENTS 9,628,886 B2 * 4/2017 Dehe ................ B81B 3/0021
2016/0131889 A1 * 5/2016 Morimoto ............ G01J 3/0208
                                                                               250/492.1

FOREIGN PATENT DOCUMENTS

| JP | H09191431 | A | * | 9/1997 |
| JP | 2003207858 | A | * | 7/2003 |
| JP | 2005010401 | A | * | 1/2005 |
| WO | WO-2023020731 | A1 | * | 2/2023 |

* cited by examiner

INSERT COAXIAL THERMAL RADIATION IMAGE EVALUATING SYSTEM

CROSS-REFERENCE TO RELATED APPLICATION

This non-provisional application claims priority under 35 U.S.C. § 119(a) on Patent Application No(s). 109116139 filed in Taiwan, R.O.C. on May 13, 2020, the entire contents of which are hereby incorporated by reference.

BACKGROUND OF THE INVENTION

1. Field of the Invention

The present disclosure relates to thermal radiation image evaluating systems, and in particular to an insert coaxial thermal radiation image evaluating system.

2. Description of the Related Art

Surveillance of a melting bath status is the most important factor in enhancing processing quality and reducing processing cost in a selective laser melting additive manufacturing process. The pertinent prior art teaches two techniques of monitoring the melting bath status.

The first technique involves capturing real-time melting bath images by evaluating thermal images with one or more CCD (Charge-coupled Device) or CMOS (Complementary Metal-Oxide-Semiconductor) and then estimating the melting bath status by 3D (3 dimensions) image processing. Although the first technique is effective in capturing real-time 3D thermal images, it fails to figure out the melting bath temperature at the point of heating under the influence of non-coherent images and thermal imager resolution. Furthermore, high-resolution thermal imagers are pricey. Therefore, the first technique is poor in price competitiveness and independence, especially because most mid-wavelength infrared sensors with high reaction intensity are still acquired by legally-controlled import nowadays.

The second technique involves evaluating thermal radiation emitted from a high-temperature melting bath with a light detector positioned coaxially (on a laser path). SLM Solutions GmbH mounts a high-temperature melting bath in an additive manufacturing processing system it developed to allow thermal radiation images to be generated by back-end process, and high-temperature melting bath thermal radiation intensity at a point of heating is evaluated in real time to function as a criterion which the high-temperature melting bath status is determined against. The second technique requires a specially designed spectroscope for not only dispersing high-power infrared (1 μm) laser but also reflecting thermal radiation. Furthermore, a photodiode employed by the second technique fails to demonstrate sufficient sensing intensity. Chivel Y. disclosed in 2013 positioning a dual-color pyrometer coaxially (on a laser path), evaluating thermal radiation emitted from a high-temperature melting bath, and generating thermal images with a scanner. The second technique requires a dual-color pyrometer and thus is pricey and poor in price competitiveness. Moreover, the second technique uses black-body radiation as the standard for color temperature and thus may not be applicable to a processed material.

Therefore, it is important to provide an insert coaxial thermal radiation image evaluating system to meet practical needs.

BRIEF SUMMARY OF THE INVENTION

An objective of the present disclosure is to provide an insert coaxial thermal radiation image evaluating system for attaining a conjugate foci framework whereby a thermal radiation generated from a high-power infrared laser irradiation zone forms according to a fixed ratio an image captured by a light detector.

To achieve at least the above objective, the present disclosure provides an insert coaxial thermal radiation image evaluating system, comprising a cage support, a first lens, a first cage movable frame, a second cage movable frame, a cage holder and a light detector. The first cage movable frame is movably disposed at the cage support. The first cage movable frame is connected to the first lens. The second cage movable frame is movably disposed at the cage support and connected to the light detector. The cage holder is connected to the cage support to fix the cage support to an optical substrate. The first cage movable frame is movably disposed in the cage holder. The first lens and a second lens of a metal additive manufacturing system together form a conjugate foci framework whereby a thermal radiation generated from a high-power infrared laser irradiation zone forms according to a fixed ratio an image captured by the light detector.

The system further comprises a connection ring for connecting the light detector to the second cage movable frame.

The system further comprises a diaphragm disposed on the cage support and in front of the light detector.

Preferably, the fixed ratio is the ratio of focal length of the second lens to focal length of the first lens, and the focal length of the first lens is no greater than the focal length of the second lens.

The system further comprises a notch filter disposed in front of the first lens.

Preferably, the light detector is an avalanche photodiode.

The system further comprises the optical substrate connected to the cage holder and an additive manufactured connection board.

The system further comprises an analog-to-digital converter and a computer, wherein the computer is connected to the light detector via the analog-to-digital converter and has a material heat spectrum database.

DETAILED DESCRIPTION OF THE INVENTION

To facilitate understanding of the object, characteristics and effects of this present disclosure, embodiments together with the attached drawings for the detailed description of the present disclosure are provided.

Figure 1:
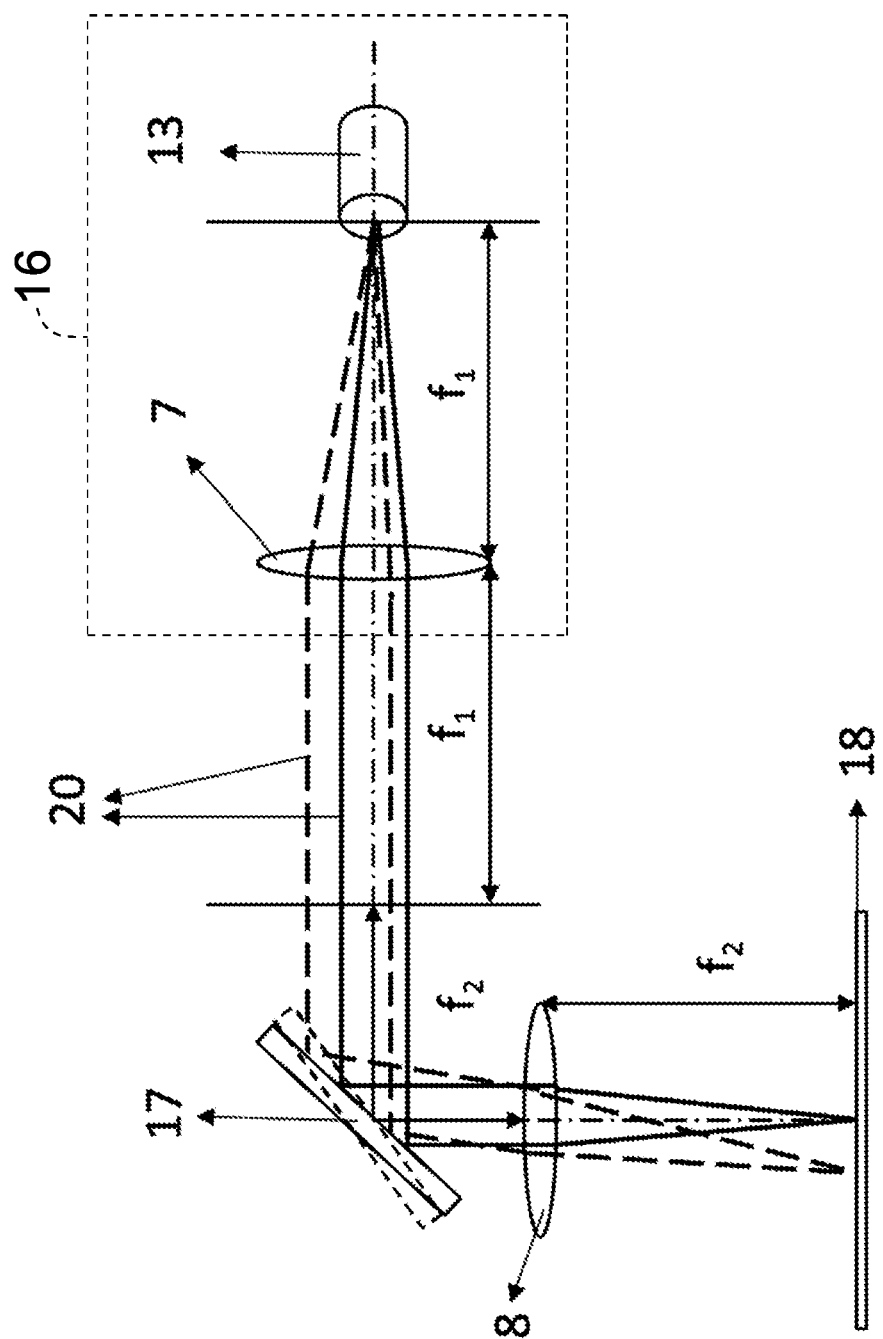
FIG. 1 is a schematic view of an insert coaxial thermal radiation image evaluating system for attaining coaxial conjugate foci according to the present disclosure.
Figure 2:
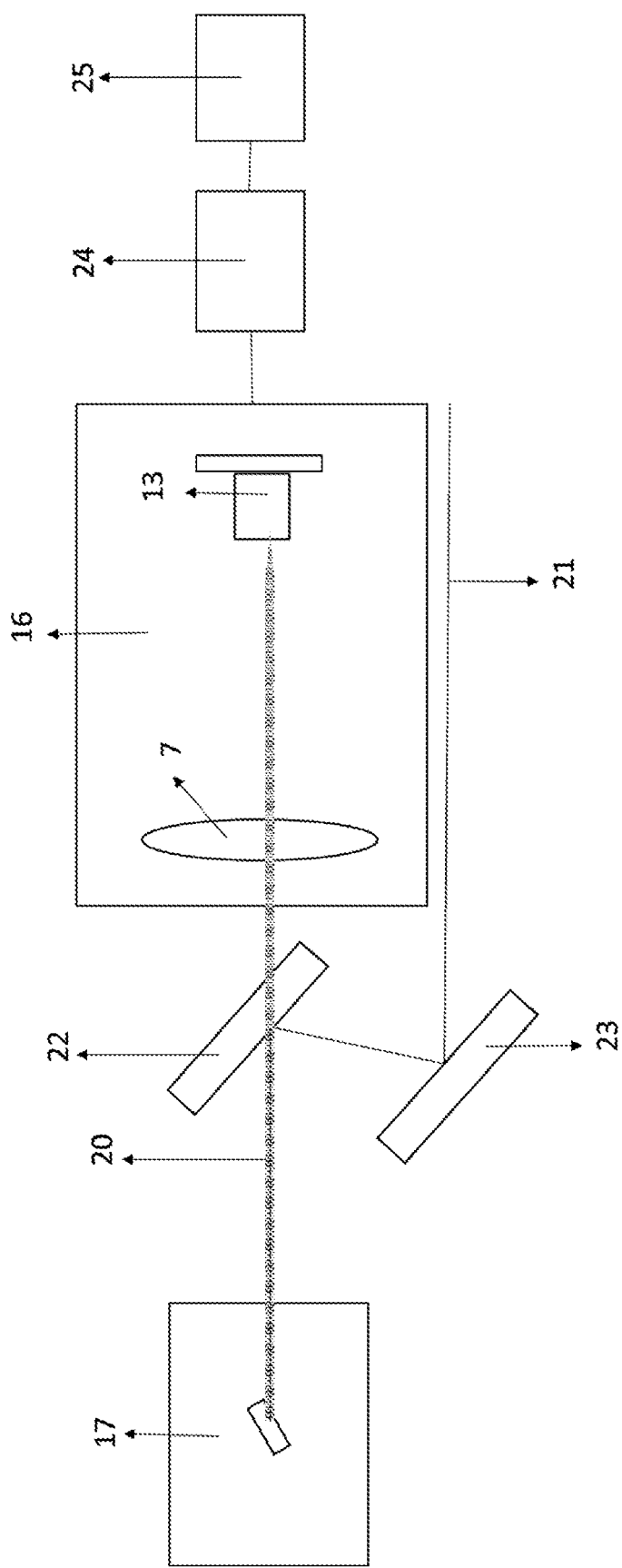
FIG. 2 is a schematic view of the insert coaxial thermal radiation image evaluating system operable in conjunction with an existing selective laser melting additive manufacturing system according to the present disclosure.
Figure 3:
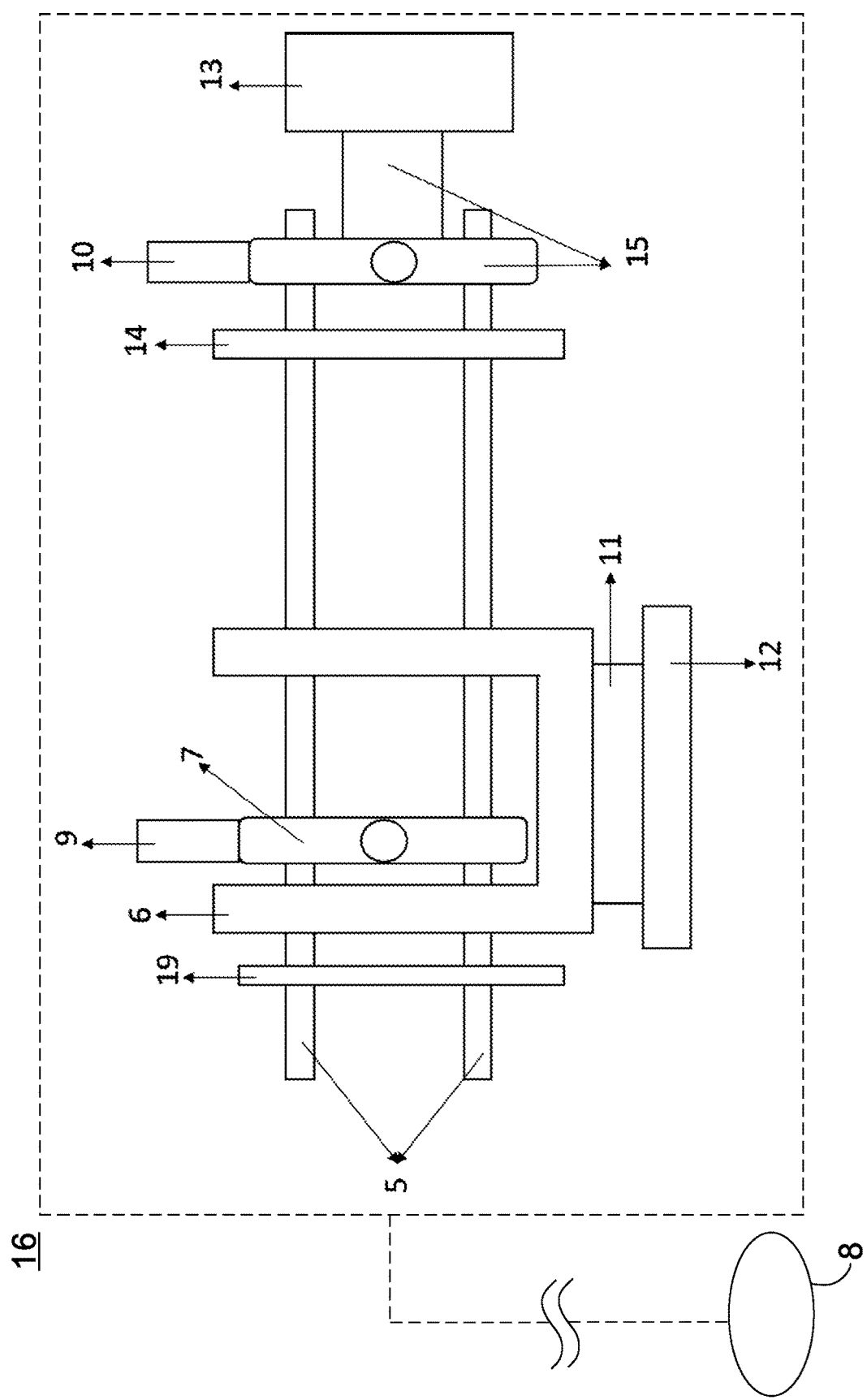
FIG. 3 is a schematic view of the insert coaxial thermal radiation image evaluating system according to the present disclosure.

Referring to FIG. 1 through FIG. 3, FIG. 1 is a schematic view of an insert coaxial thermal radiation image evaluating system 16 for attaining coaxial conjugate foci according to the present disclosure. FIG. 2 is a schematic view of the insert coaxial thermal radiation image evaluating system 16 operable in conjunction with an existing selective laser melting additive manufacturing system according to the present disclosure. FIG. 3 is a schematic view of the insert coaxial thermal radiation image evaluating system 16 of the present disclosure. Referring to FIG. 1 and FIG. 2, the metal additive manufacturing system comprises a high-power infrared laser 21, dichroic mirrors 22, 23, a scanner 17, a second lens 8 and a laser irradiation zone 18. Laser emitted from the high-power infrared laser (processing laser) 21 falls on the scanner 17 via the dichroic mirrors 22, 23. The to-be-sintered zone of the laser irradiation zone 18, which the laser emitted from the high-power infrared laser 21 falls on, varies with the angle of the scanner 17. During a fabrication process, the high-power infrared laser 21 melts the metallic powder of the laser irradiation zone 18 and thereby generates the thermal radiation 20, and then the thermal radiation 20 is introduced into the insert coaxial thermal radiation image evaluating system 16 via the scanner 17. The insert coaxial thermal radiation image evaluating system 16 essentially comprises a first lens 7 (with a focal length f1 of 250 mm in this embodiment) and a amplified silicon light detector 13 which are coupled together to form a cage structure. The distance between the first lens 7 and the second lens 8 (or flat focusing mirror) of the metal additive manufacturing system is adjusted by adjusting the position of the first lens 7 and the position of the light detector 13 with a view to attaining coaxial conjugate foci. The thermal radiation 20 generated from the laser irradiation zone 18 forms according to a fixed ratio an image captured by the light detector 13. The fixed ratio is the ratio of the focal length f2 of the second lens 8 to the focal length f1 of the first lens 7. In this embodiment, the focal length f1 of the first lens 7 is less than or equal to the focal length f2 of the second lens 8.

Referring to FIG. 3, the insert coaxial thermal radiation image evaluating system 16 comprises a cage support 5, a first lens 7, a first cage movable frame 9, a second cage movable frame 10, a cage holder 6 and light detector 13. The first cage movable frame 9 is movably disposed at the cage support 5 and connected to the first lens 7. The first cage movable frame 9 is capable of fine-tuning an optical path. The second cage movable frame 10 is movably disposed at the cage support 5 and connected to the light detector 13. In this embodiment, the light detector 13 is connected to the second cage movable frame 10 via a connection ring 15 and thus moved together with the second cage movable frame 10. The cage holder 6 is connected to the cage support 5 to fix the cage support 5 to an optical substrate 11, whereas the first cage movable frame 9 is movably disposed in the cage holder 6. According to the present disclosure, the first cage movable frame 9 is moved relative to the cage support 5 to adjust the distance between the first lens 7 and the second lens 8 of the metal additive manufacturing system of FIG. 1. Thus, the first lens 7 and the second lens 8 together form a conjugate foci framework whereby the thermal radiation 20 generated from the laser irradiation zone 18 forms according to a fixed ratio an image captured by the light detector 13. The fixed ratio is the ratio of the focal length f2 of the second lens 8 to the focal length f1 of the first lens 7. In this embodiment, the focal length f1 of the first lens 7 is less than or equal to the focal length f2 of the second lens 8. Thus, all radiation outside the laser irradiation point cannot pass through the insert coaxial thermal radiation image evaluating system to reach the light detector 13, thereby allowing imaging to be achieved by scanning. In other words, imaging is achieved by processing the light intensity distribution of the thermal radiation 20 along the laser path of the laser irradiation zone 18, rotating the scanner 17, and calculating its actual location, wherein the scope of images is identical to the scope of scanning. The conjugate foci optical system is capable of filtering out the other noise and thus conducive to reduction of noise.

In this embodiment, the diaphragm 14 is disposed on the cage support 5 and in front of the light detector 13 to block background light interference and enhance lateral resolution of system imaging.

In this embodiment, the focal lengths f1, f2 of the first lens 7 and second lens 8 are 250 mm, but the present disclosure is not limited thereto. In a variant embodiment, the focal length f1 of the first lens 7 is less than the focal length f2 of the second lens 8, such that the thermal radiation 20 admitted into the insert coaxial thermal radiation image evaluating system 16 is focused onto the light detector 13.

In this embodiment, the insert coaxial thermal radiation image evaluating system 16 further comprises a notch filter 19. The center wavelength for the notch filter 19 is 1064 nm, and the notch bandwidth for the notch filter 19 is 36 nm. The notch filter 19 is disposed in front of the first lens 7 to stop the energy of processing laser wavelength from entering the light detector 13 via the insert coaxial thermal radiation image evaluating system 16 and thus prevent it from interfering with or even damaging the light detector 13.

In this embodiment, the light detector 13 is an avalanche photodiode for constructing color-comparing sensing.

In this embodiment, the optical substrate 11 connects to the cage holder 6 and the customized additive manufactured connection board 12 and enables the height of the insert coaxial thermal radiation image evaluating system 16 to be aligned with the center of the laser path.

In this embodiment, as shown in FIG. 2, the light detector 13 is connected to the computer 25 via an analog-to-digital converter 24, and the computer 25 has a material heat spectrum database. Therefore, the insert coaxial thermal radiation image evaluating system 16 of the present disclosure and the material heat spectrum database together effect thermal imaging and recording.

Therefore, the present disclosure employs a conjugate foci framework and uses the scanner 17 to scan and turn the thermal radiation 20 signals into images, and the resultant images have transverse and vertical resolution. Furthermore, the insert system (cage support 5, first cage movable frame 9, second cage movable frame 10, and cage holder 6) of the cage framework can be easily set up and adjusted on most domestically manufactured metal additive manufacturing system frameworks. Also, the present invention employs a high-sensitivity avalanche photodiode to further construct color-comparing sensing. Moreover, the present disclosure not only attains the thermal radiation 20 (usually within the range of the infrared wavelength) but also evaluates laser plasma generation (usually within the range of visible light wavelength) generated in a processing process. In other words, the present disclosure enhances the precision of surveillance of a melting bath status, enhances the efficiency of additive manufacturing processing, and reduces manufacturing cost, not to mention that the insert coaxial thermal radiation image evaluating system 16 can be easily mounted on domestically manufactured metal additive manufacturing system frameworks.

While the present disclosure has been described by means of specific embodiments, numerous modifications and variations could be made thereto by those skilled in the art without departing from the scope and spirit of the present disclosure set forth in the claims.

What is claimed is:

1. An insert coaxial thermal radiation image evaluating system, comprising:
   a cage support;
   a first lens;
   a first cage movable frame movably disposed at the cage support and connected to the first lens;
   a light detector;
   a second cage movable frame movably disposed at the cage support and connected to the light detector; and
   a cage holder connected to the cage support to fix the cage support to an optical substrate, wherein the first cage movable frame is movably disposed in the cage holder,
   wherein the first lens and a second lens of a metal additive manufacturing system together form a structure of conjugate foci, such that a thermal radiation generated from a high-power infrared laser irradiation zone forms according to a fixed ratio an image captured by the light detector.

2. The insert coaxial thermal radiation image evaluating system of claim 1, further comprising a connection ring for connecting the light detector to the second cage movable frame.

3. The insert coaxial thermal radiation image evaluating system of claim 1, further comprising a diaphragm disposed on the cage support and in front of the light detector.

4. The insert coaxial thermal radiation image evaluating system of claim 1, wherein the fixed ratio is the ratio of focal length of the second lens to focal length of the first lens, and the focal length of the first lens is no greater than the focal length of the second lens.

5. The insert coaxial thermal radiation image evaluating system of claim 1, further comprising a notch filter disposed in front of the first lens.

6. The insert coaxial thermal radiation image evaluating system of claim 1, wherein the light detector is an avalanche photodiode.

7. The insert coaxial thermal radiation image evaluating system of claim 1, further comprising the optical substrate connected to the cage holder and an additive manufactured connection board.

8. The insert coaxial thermal radiation image evaluating system of claim 1, further comprising an analog-to-digital converter and a computer, wherein the computer is connected to the light detector via the analog-to-digital converter and has a material heat spectrum database.

* * * * *